United States Patent
Lee

(10) Patent No.: US 9,274,533 B2
(45) Date of Patent: Mar. 1, 2016

(54) RADIO FREQUENCY IDENTIFICATION DEVICES

(71) Applicant: Samsung Electronics Co., Ltd., Suwon-si (KR)

(72) Inventor: Seungwon Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 271 days.

(21) Appl. No.: 13/961,170

(22) Filed: Aug. 7, 2013

(65) Prior Publication Data

US 2014/0043003 A1    Feb. 13, 2014

(30) Foreign Application Priority Data

Aug. 13, 2012 (KR) .................. 10-2012-0088601

(51) Int. Cl.
G06K 19/06 (2006.01)
G05F 1/10 (2006.01)
G06K 19/077 (2006.01)

(52) U.S. Cl.
CPC ............ *G05F 1/10* (2013.01); *G06K 19/07749* (2013.01)

(58) Field of Classification Search
CPC ....... G06K 19/06; G06K 19/02; G06K 19/00; G06K 7/08; G06K 5/00; G06F 17/00
USPC .................. 235/492, 380, 488, 451, 487, 375
See application file for complete search history.

(56) References Cited

U.S. PATENT DOCUMENTS

| | | | |
|---|---|---|---|
| 5,479,172 A | 12/1995 | Smith et al. | |
| 6,972,662 B1 | 12/2005 | Ohkawa et al. | |
| 7,705,712 B2 | 4/2010 | Kelly et al. | |
| 7,835,422 B2 | 11/2010 | Kurokawa | |
| 2005/0134435 A1* | 6/2005 | Koyama et al. | ............ 340/10.34 |
| 2007/0024333 A1* | 2/2007 | Suzuki | ............ 327/143 |
| 2008/0093463 A1* | 4/2008 | Chang et al. | ............ 235/492 |
| 2008/0100491 A1* | 5/2008 | Umeda et al. | ............ 341/176 |
| 2008/0230821 A1* | 9/2008 | Shionoiri | ............ 257/296 |
| 2008/0315995 A1 | 12/2008 | Okuda | |
| 2012/0161942 A1* | 6/2012 | Muellner et al. | ............ 340/10.5 |

FOREIGN PATENT DOCUMENTS

| | | |
|---|---|---|
| JP | 2002-165458 | 6/2002 |
| JP | 2005-293597 | 10/2005 |
| JP | 2007-140903 | 6/2007 |
| JP | 2009-182852 | 8/2009 |
| JP | 2010-170248 | 8/2010 |
| KR | 10-2008-0058052 A | 6/2008 |

* cited by examiner

*Primary Examiner* — Edwyn Labaze
(74) *Attorney, Agent, or Firm* — Myers Bigel & Sibley

(57) ABSTRACT

Radio frequency identification (RFID) devices are provided including a contactless internal voltage generator configured to generate a rectification voltage responsive to a radio frequency (RF) input signal and an internal voltage responsive to the generated rectification voltage and a reference voltage; a clock generator configured to sense an amount of current to a sink path of the contactless internal voltage generator and to generate a clock signal using a variable resistance value, the variable resistance value based on the amount of current sensed; and an internal circuit driven by the internal voltage and the clock signal.

14 Claims, 12 Drawing Sheets

RADIO FREQUENCY IDENTIFICATION DEVICES

CLAIM OF PRIORITY

This application claims priority to Korean Patent Application No. 10-2012-0088601 filed Aug. 13, 2012, in the Korean Intellectual Property Office, the entire contents of which are hereby incorporated herein by reference as if set forth in its entirety.

FIELD

The inventive concept relates generally to radio frequency identification (RFID) devices and, more particularly to, RFID devices having clock generation circuits that generate a clock signal using a variable resistance value.

BACKGROUND

Radio Frequency Identification (RFID) may be a contactless identification technique. With the RFID technique, an RFID tag may be attached to an object and then communicate with an RFID reader positioned remote from the RFID tag. The RFID tag communicates with the RFID reader by transmission and/or reception of a wireless signal. RFID may enable the object to which the RFID tag is attached to be automatically identified using the wireless signal.

SUMMARY

Some embodiments of the present inventive concept provide a radio frequency identification (RFID) device including a contactless internal voltage generator configured to generate a rectification voltage responsive to a radio frequency (RF) input signal and an internal voltage responsive to the generated rectification voltage and a reference voltage; a clock generator configured to sense an amount of current to a sink path of the contactless internal voltage generator and to generate a clock signal using a variable resistance value, the variable resistance value based on the amount of current sensed; and an internal circuit driven by the internal voltage and the clock signal.

In further embodiments, the contactless internal voltage generator may be further configured to generate an induced voltage responsive to the RF input signal and to rectify the induced voltage to generate the rectification voltage.

In still further embodiments the contactless internal voltage generator may include a first transistor between a first node that outputs the rectification voltage and a second node that outputs a first internal voltage; a second transistor between the second node and a ground; a third transistor between the second node and a third node that outputs the internal voltage; a first comparator configured to output a first comparison value between the reference voltage and a first division voltage to a gate of the first transistor; a second comparator configured to output a second comparison value between the reference voltage and a second division voltage to a gate of the second transistor; and a third comparator configured to output a third comparison value between the reference voltage and a third division voltage to a gate of the third transistor. The first division voltage may be a division voltage of the rectification voltage via first resistors connected in series between the first node and a ground, the second division voltage may be a division voltage of the first internal voltage via second resistors connected in series between the second node and the ground, and the third division voltage may be a division voltage of the internal voltage via third resistors connected in series between the third node and the ground.

In some embodiments, the contactless internal voltage generator may further include a first rectification capacitor between the first node and the ground and configured to maintain a level of the first internal voltage constantly; and a second rectification capacitor between the second node and the ground and configured to maintain a level of the first internal voltage constantly.

In further embodiments, the contactless internal voltage generator may include a first PMOS transistor between a first node that outputs the rectification voltage of the RFID rectifier and a second node that outputs the internal voltage; a first NMOS transistor between the second node and a ground; a first comparator configured to output a first comparison result between the reference voltage and a first division voltage to a gate of the first PMOS transistor; and a second comparator configured to output a second comparison result between the reference voltage and a second division voltage to a gate of the first NMOS transistor. The first division voltage may be a division voltage of the rectification voltage via first resistors connected in series between the first node and the ground, and the second division voltage may be a division voltage of the internal voltage via second resistors connected in series between the second node and the ground.

In still further embodiments, the RFID device may further include a contact internal voltage generator configured to receive a power supply voltage from an external device from a pad and to generate the internal voltage using the power supply voltage and the reference voltage.

In some embodiments, the contact internal voltage generator may include a PMOS transistor between a power terminal supplied with the power supply voltage and an output terminal that outputs the internal voltage; and a comparator configured to output a comparison result between the reference voltage and a division voltage to a gate of the PMOS transistor. The division voltage may be a division voltage of the internal voltage via resistors connected in series between the output terminal and a ground.

In further embodiments, the device may further include a power switch configured to generate an enable signal when one of the rectification voltage is supplied from the contactless internal voltage generator and the power supply voltage is supplied from the contact internal voltage generator. The contactless internal voltage generator and/or the contact internal voltage generator may be activated by the enable signal.

In still further embodiments, the device may further include a first protection transistor configured to connect a first node that outputs the rectification voltage to a ground when the power supply voltage is applied to the power switch; and a second protection transistor configured to connect the pad to the ground when the rectification voltage is applied to the power switch.

In some embodiments, the clock generator may include a current amount sensing unit configured to sense a voltage corresponding to the amount of current flowing to the sink path and to provide a sensing current corresponding to the sensed voltage flow; and an RC clock generator configured to generate the clock signal using the variable resistance value corresponding to the sensing current and a capacitor.

In further embodiments, the RC clock generator may include a control voltage generating unit configured to output a control voltage corresponding to the sensing current; a first internal signal generating unit configured to generate a first internal voltage by comparing the control voltage and a voltage corresponding to the clock signal; a second internal signal generating unit configured to generate a second internal voltage by comparing the control voltage and a voltage corresponding to an inverted version of the clock signal; and a clock generating unit configured to generate the clock by performing an AND operation on the second internal signal and the inverted version of the clock signal and to generate the inverted version of the clock signal by performing an AND operation on the first internal signal and the clock signal.

In still further embodiments, the device may further include a reference voltage generator configured to generate the reference voltage.

Some embodiments of the present inventive concept provide a radio frequency identification (RFID) device including a contactless internal voltage generator configured to generate a rectification voltage responsive to an input of a radio frequency (RF) signal and an internal voltage based on the rectification voltage and a reference voltage in response to an enable signal; a contact internal voltage generator configured to generate the internal voltage based on a power supply voltage externally provided and the reference voltage in response to the enable signal; a power switch configured to generate the enable signal when one of the rectification voltage is generated and the power supply voltage is received; and a logic circuit driven by the internal voltage.

In further embodiments, the contactless internal voltage generator may include an RF rectifier configured to generate an induced voltage responsive to an input of the RF signal and to output the rectification voltage obtained by rectifying the induced voltage to a first node; a first PMOS transistor between the first node and a second node that outputs the internal voltage; a first NMOS transistor between the second node and a ground; a first comparator configured to output a first comparison value between the reference voltage and a first division voltage to a gate of the first PMOS transistor; and a second comparator configured to output a second comparison value between the reference voltage and a second division voltage to a gate of the first NMOS transistor. The first division voltage may be a division voltage of the rectification voltage via first resistors connected in series between the first node and a ground and the second division voltage may be a division voltage of the internal voltage via second resistors connected in series between the second node and the ground. The contact internal voltage generator may include a second PMOS transistor between a pad supplied with the power supply voltage and the second node. The comparator may be configured to output a third comparison result between the reference voltage and a third division voltage to a gate of the second PMOS transistor, the third division voltage may be a division voltage of the internal voltage via third resistors connected in series between the second node and a ground.

In still further embodiments, the device may further include an auto gain controller configured to mirror a path of the rectification voltage and a path of the internal voltage and to adjust the amount of current of a detection node for detecting the RF signal.

Some embodiments of the present inventive concept provide a radio frequency identification (RFID) device including a clock generator configured to sense an amount of current to a sink path of a contactless internal voltage generator and to generate a clock signal using a variable resistance value, the variable resistance value based on the amount of current sensed.

In further embodiments, the contactless internal voltage generator may be configured to generate a rectification voltage responsive to a radio frequency (RF) input signal and an internal voltage responsive to the generated rectification voltage and a reference voltage. The device may further include an internal circuit driven by the internal voltage and the clock signal.

In still further embodiments, a frequency of the clock signal may be close to an ideal frequency when an electric field is weak. The electric field may be weak when a magnitude of the RF signal is small.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION

Figure 1:
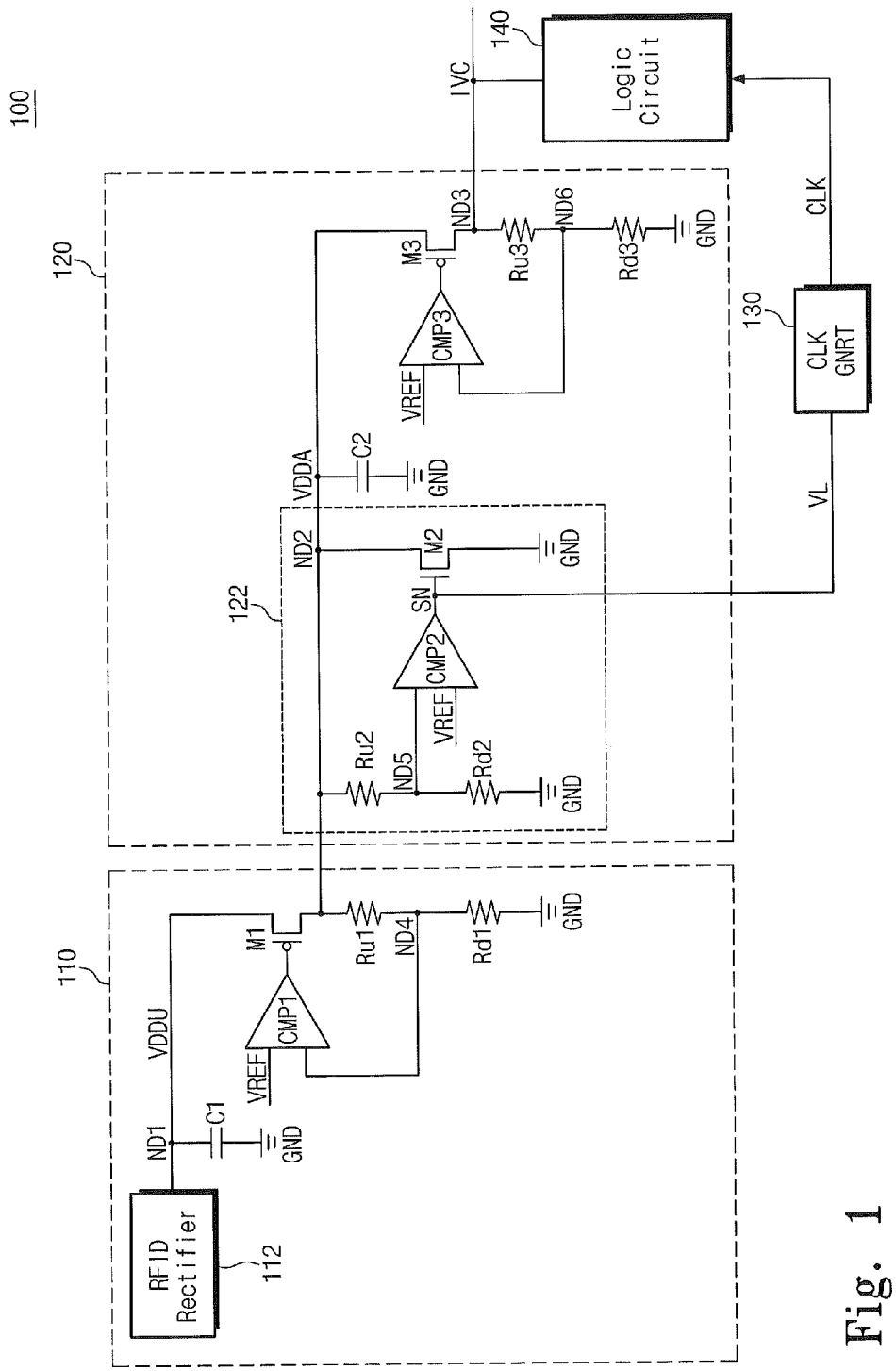
FIG. 1 is a block diagram illustrating a radio frequency identification (RFID) device according to some embodiments of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Referring first to FIG. 1, a block diagram schematically illustrating an RFID device according to some embodiments of the inventive concept will be discussed. As illustrated in FIG. 1, an RFID device 100 may include a first voltage regulator 110, a second voltage regulator 120, a clock generator 130, and a logic circuit 140.

The first voltage regulator 110 may receive an RF signal to generate an induced voltage, generate a rectification voltage VDDU using the induced voltage, and output a first internal voltage VDDA using the rectification voltage VDDU and a reference voltage VREF. In some embodiments, the induced voltage may be from about 6.5V to about 7.5V. However, it will be understood that embodiments of the present inventive concept are not limited to this voltage range.

The first voltage regulator 110 may include an RFID rectifier 112, a first rectification capacitor C1, a first transistor M1, a first comparator CMP1, a first upper resistor Ru1, and a first lower resistor Rd1.

The RFID rectifier 112 may generate the rectification voltage VDDU by rectifying an RF signal. The RFID rectifier 112 may include a bridge, which may include four diodes. In some embodiments, the rectification voltage VDDU may be about 4.0V. However, the inventive concept is not limited thereto.

In some embodiments, the reference voltage VREF may be generated from a reference voltage generator. The reference voltage generator may generate the reference voltage VREF using the first internal voltage VDDA or a second internal voltage IVC.

The first rectification capacitor C1 may be connected between a first node ND1 and a ground GND to maintain the rectification voltage VDDU constantly.

The first transistor M1 may have a source connected with the first node ND1 to receive the rectification voltage VDDU and a drain connected with a second node ND2 to output the first internal voltage VDDA. In some embodiments, the first transistor M1 may be a PMOS transistor. The first transistor M1 may control the amount of current supplied to the second node ND2.

The first comparator CMP1 may compare the reference voltage and a first division voltage of a fourth node to provide a comparison result to a gate of the first transistor M1. In other words, the first comparator CMP1 may constantly maintain the first internal voltage VDDA by controlling the first transistor M1 according to the first division voltage corresponding to the first internal voltage VDDA (or, through a feedback of the first internal voltage VDDA). In some embodiments, the first internal voltage VDDA may be from about 3.0V to 4.0V. However, it will be understood that embodiments of the inventive concept are not limited thereto.

The first upper resistor Ru1 and the first lower resistor Rd1 may be used to divide the first internal voltage VDDA for generation of the first division voltage. As used herein, the first division voltage may be decided by Ru1/(Ru1+Rd1)×VDDA. The first upper resistor Ru1 may be connected between the second node ND2 and the fourth node ND4, and the first lower resistor Rd1 may be connected between the fourth node ND4 and a ground GND.

The second voltage regulator 120 may receive the first internal voltage VDDA to generate the second internal voltage IVC (or, an internal voltage) using the first internal voltage VDDA and the reference voltage VREF. As used herein, the second internal voltage IVC may be lower than the first internal voltage VDDA. The second voltage regulator 120 may include a current sinker 122, a second rectification capacitor C2, a third transistor M3, a third comparator CMP3, a third upper resistor Ru3, and a third lower resistor Rd3.

The current sinker 122 may be connected between the second node ND2 and a ground, and may drain a current to a ground when current consumption is less. In some embodiments, the current sinker 122 may drain a current more than 100 μA to a ground from the second node ND2. However, it will be understood that embodiments of the inventive concept are not limited thereto. The current sinker 122 may include a second transistor M2, a second comparator CMP2, a second upper resistor Ru2, and a second lower resistor Rd2.

The second transistor M2 may be connected between the second node ND2 and a ground GND, and may have a source connected to receive the first internal voltage VDDA and a drain grounded. In some embodiments, the second transistor M2 may be an NMOS transistor. The second transistor M2 may control the amount of current sunk from the second node ND2.

The second comparator CMP2 may compare the reference voltage VREF and a second division voltage of a fifth node ND5, and may provide a comparison result to a gate of the second transistor M2. In other words, the second comparator CMP2 stops a current from excessively flowing into the second node ND2 by controlling the second transistor M2 according to the second division voltage corresponding to the first internal voltage VDDA (or, through a feedback of the first internal voltage VDDA).

The second upper resistor Ru2 and the second lower resistor Rd2 may be used to divide the first internal voltage VDDA for generation of the second division voltage. As used herein, the second division voltage may be decided by Ru2/(Ru2+Rd2)×VDDA. The second upper resistor Ru2 may be connected between the second node ND2 and the fifth node ND5, and the second lower resistor Rd2 may be connected between the fifth node ND5 and a ground GND.

The second rectification capacitor C2 may be connected between the second node ND2 and a ground GND to constantly maintain a level of the first internal voltage VDDA.

The third transistor M3 may be connected between the second node ND2 and a third node ND3, and may have a source connected to receive the first internal voltage VDDA and a drain connected with the third node ND3 to receive the second internal voltage IVC. In some embodiments, the third transistor M3 may be a PMOS transistor. The third transistor M3 may control the amount of current supplied to the third node ND3.

The third comparator CMP3 may compare the reference voltage VREF and a third division voltage of the third node ND3, and may provide a comparison result to a gate of the third transistor M3. In other words, the third comparator CMP3 may constantly maintain the second internal voltage IVC output to the third node ND3 by controlling the third transistor M3 according to the third division voltage corresponding to the first internal voltage VDDA (or, through a feedback of the second internal voltage IVC).

The third upper resistor Ru3 and the third lower resistor Rd3 may be used to divide the third internal voltage IVC for generation of the third division voltage. As used herein, the third division voltage may be decided by Ru3/(Ru3+Rd3)×VDDA. The third upper resistor Ru3 may be connected between the third node ND3 and a sixth node ND6, and the third lower resistor Rd3 may be connected between the sixth node ND6 and a ground GND.

The clock generator 130 may sense the amount of current flowing via a sink path of the second regulator 120 to generate a clock CLK using the sensed amount of current. As used herein, the sink path may be a current path of the second transistor M2 of the current sinker 122. In some embodiments, the clock generator 130 may be connected with a sense node SN. The clock generator 130 may sense the amount of current sunk to change/vary/adjust/control a frequency of the clock CLK according to the sensed amount of current sunk. The clock generator 130, as illustrated in FIG. 1, may generate the clock CLK corresponding to a sink voltage VL corresponding to the amount of current flowing via a current path of the current sinker 122, i.e., the sink path.

The logic circuit 140 may be driven by the second internal voltage IVC provided from the second voltage regulator 120 and the clock CLK. The logic circuit 140 may include circuits to perform an operation of the RFID device 100. For example, the logic circuit 140 may include a data transceiver circuit associated with an RF signal.

In conventional RFID devices although an internally consumed current exceeds a supply current, it may instantly operate at a frequency higher than a normal frequency by dropping a clock frequency of a system through a drop of the first internal voltage VDDA. The drop of the first internal voltage VDDA may provide information indicating whether an RFID device performs any operation internally. In other words, the conventional RFID device may be prone to security problems.

RFID devices 100 in accordance with embodiments of the present inventive concept may perform an internal operation more stably by sensing the amount of current of a sink path and generating a clock CLK according to the sensed amount of current. As a result, it may be possible to solve the above-described security problem and frequency problem, i.e., generation of a frequency higher than a normal frequency).

Figure 2:
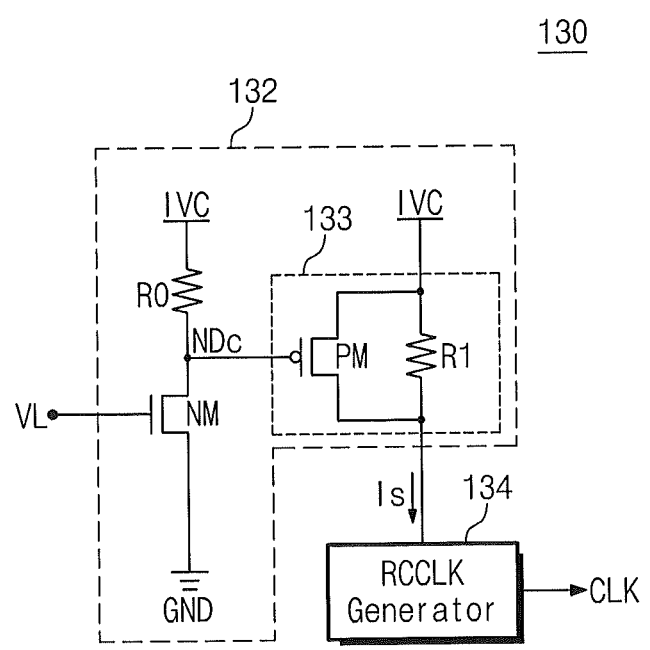
FIG. 2 is a circuit diagram illustrating a clock generator according to some embodiments of the inventive concept.

Referring now to FIG. 2, a circuit diagram schematically illustrating a clock generator according to some embodiments of the inventive concept will be discussed. As illustrated in FIG. 2, a clock generator 130 may include a current amount sensing unit 132 and an RC clock generator 134.

The current amount sensing unit 132 may include a variable resistor 133, a source resistor R0, and an NMOS transistor NM. The variable resistor 133 may include a control resistor R1 and a PMOS transistor PM which are connected in parallel. In some embodiments, the control resistor R1 may have a very large value.

The NMOS transistor NM may be connected between a current control node NDc and a ground GND, and may make a sensing current Is corresponding to an input sink voltage VL flow via the source resistor R0. The source resistor R0 may be connected between a power terminal and the current control node NDc. As used herein, the power terminal may be supplied with a second internal voltage IVC. The PMOS transistor PM may be connected between the power terminal and the RC clock generator 134, and may have a gate connected with the current control node NDc.

The RC clock generator 134 may generate a clock CLK using a resistance component and a capacitance component. As used herein, the resistance component may vary according to the current amount sensing unit 132, and may correspond to the sensing current Is.

In operation, in embodiments where the amount of current consumed is less than the amount of current supplied from an RFID device 100 (FIG. 1), a current may flow via a sink path. A sink voltage VL corresponding to the amount of current flowing via the sink path may be provided to the NMOS transistor NM. As the NMOS transistor NM is turned on by the sink voltage VL, a current may flow via the source resistor R0. Thus, a gate of the PMOS transistor PM, i.e., the current control node NDc, may maintain 0V. In these embodiments, the RC clock generator 134 may generate the clock CLK without influence of the control resistor R1.

In embodiments where the amount of current consumed is more than the amount of current supplied from the RFID device 100 (FIG. 1), a current may not almost flow via the sink path. Thus, the sink voltage VL may be 0V. As the NMOS transistor NM is turned off by the sink voltage VL, no current may flow via the source resistor R0, so that the PMOS transistor PM is turned off. In these embodiments, the amount of current supplied to the RC clock unit 134 may be controlled by the control resistor R1. In other words, the clock CLK may have a very slow frequency by the control resistor R1. As a result, when a first internal voltage VDDA is dropped due to an increase in current consumption, a frequency of the clock CLK may decrease by the sink voltage VL. Thus, it may be possible to reduce the likelihood that the first internal voltage VDDA will drop sharply.

Figure 3:
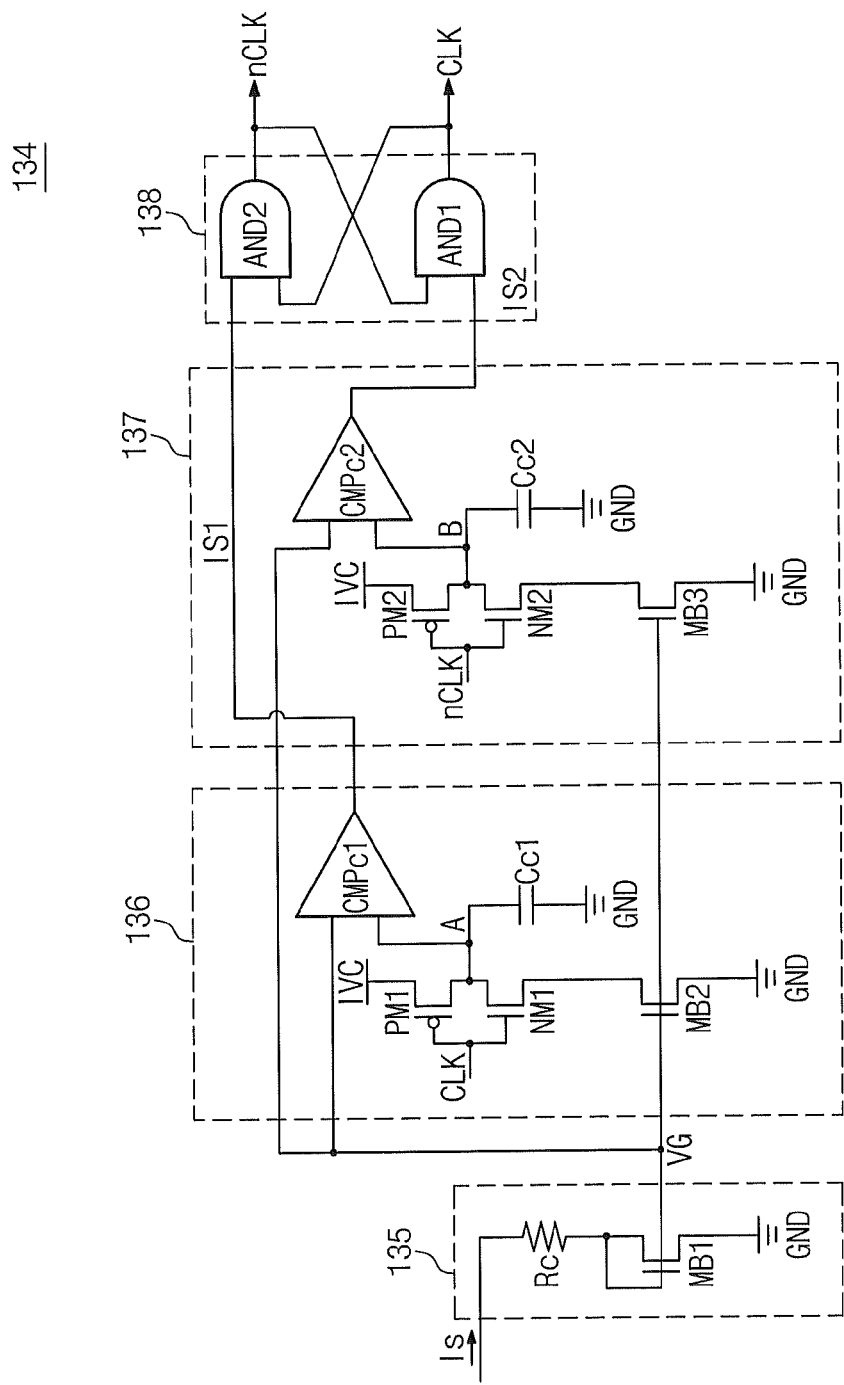
FIG. 3 is a diagram illustrating an RC clock generator according to some embodiments of the inventive concept.

Referring now to FIG. 3, a diagram illustrating an RC clock generator 134 according to some embodiments of the inventive concept will be discussed. As illustrated in FIG. 3, an RC clock generator 134 may include a control voltage generating unit 135, a first internal signal generating unit 136, a second internal signal generating unit 137, and a clock generating unit 138.

The control voltage generating unit 135 may generate a control voltage VG corresponding to a current Is output from a current amount sensing unit 132. The control voltage generating unit 135 may include a clock resistor Rc and a first bias transistor MB1. The clock resistor Rc may be connected between the current amount sensing unit 132 and a source of the first bias transistor MB1. The first bias transistor MB1 may be connected between the clock resistor Rc and a ground GND, and may have a gate and a source which are interconnected. The control voltage generating unit 135 may generate the control voltage VG corresponding to a sensing current Is flowing via the clock resistor Rc. As used herein, the sensing current Is flowing via the clock resistor Rc may be a current output from the current amount sensing unit 132.

The first internal signal generating unit 136 may generate a first internal signal IS1 in response to the control voltage VG and a clock CLK. The first internal signal generating unit 136 may include a first clock voltage comparator CMPc1, a first PMOS transistor PM1, a first NMOS transistor NM1, a first clock capacitor Cc1, and a second bias transistor MB2.

The first clock voltage comparator CMPc1 may compare the control voltage VG and a voltage of a node A to output the first internal signal IS1. In other words, the first internal signal IS1 may indicate a comparison result between the control voltage VG and a voltage of the node A corresponding to the clock CLK. The first PMOS transistor PM1 and the first NMOS transistor NM1 may be connected in series, and gates of the transistors PM1 and NM1 may be connected in common to receive the clock CLK. The first clock capacitor Cc1 may be connected between the node A and a ground GND to maintain a voltage of the node A. The second bias transistor MB2 may be connected between a drain of the first NMOS transistor NM1 and a ground GND, and may have a gate connected to receive the control voltage VG.

The second internal signal generating unit 137 may be implemented the same as the first internal signal generating unit 136. The first internal signal generating unit 136 may receive the clock CLK to output the first internal signal IS1, and the second internal signal generating unit 137 may receive an inversed version of the clock nCLK to output a second internal signal IS2.

The clock generating unit 138 may include a first AND calculation unit AND1 and a second AND calculation unit AND2. The first AND calculation unit AND1 may output the clock CLK by performing an AND operation on the inversed clock nCLK and the second internal signal IS2. The second AND calculation unit AND2 may output the inverted clock nCLK by performing an AND operation on the clock CLK and the first internal signal IS1.

The RC clock generator 134 may generate the clock CLK based on a resistance value corresponding to a sensing current Is output from the current amount sensing unit 132.

Figure 4:
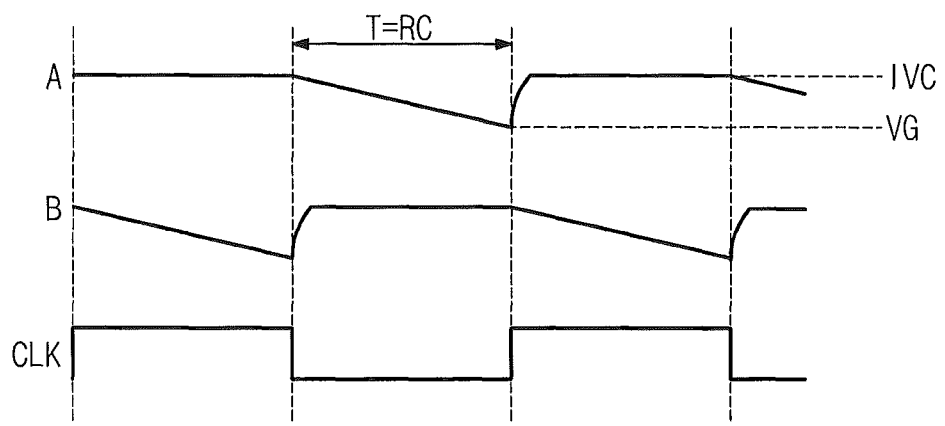
FIG. 4 is a diagram illustrating a waveform of a clock generated from an RC clock generator according some embodiments of the inventive concept.

Referring now to FIG. 4, a diagram illustrating a waveform of a clock generated from an RC clock generator according to some embodiments of the inventive concept will be discussed. As illustrated in FIG. 4, a half period T of a clock may be "RC". As used herein, R may indicate a resistance value shown at a source of a first bias transistor MB1, and C may indicate a capacitance value of each of first and second clock capacitors Cc1 and Cc2. The resistance value R may vary according to a sink voltage VL corresponding to the amount of current of a sink path. For example, an RC clock generator 134 according to the inventive concept may decrease a frequency of a clock CLK by increasing a resistance value R when a current does not almost flow via the sink path.

As discussed above with respect to FIGS. 1 through 4, an RFID device 100 generates an internal voltage IVC according to a contactless mode. However, it will be understood that embodiments of the present inventive concept are not limited thereto. The RFID device 100 may be implemented to generate the internal voltage IVC according to a contactless mode or a contact mode without departing from the scope of the present inventive concept.

Figure 5:
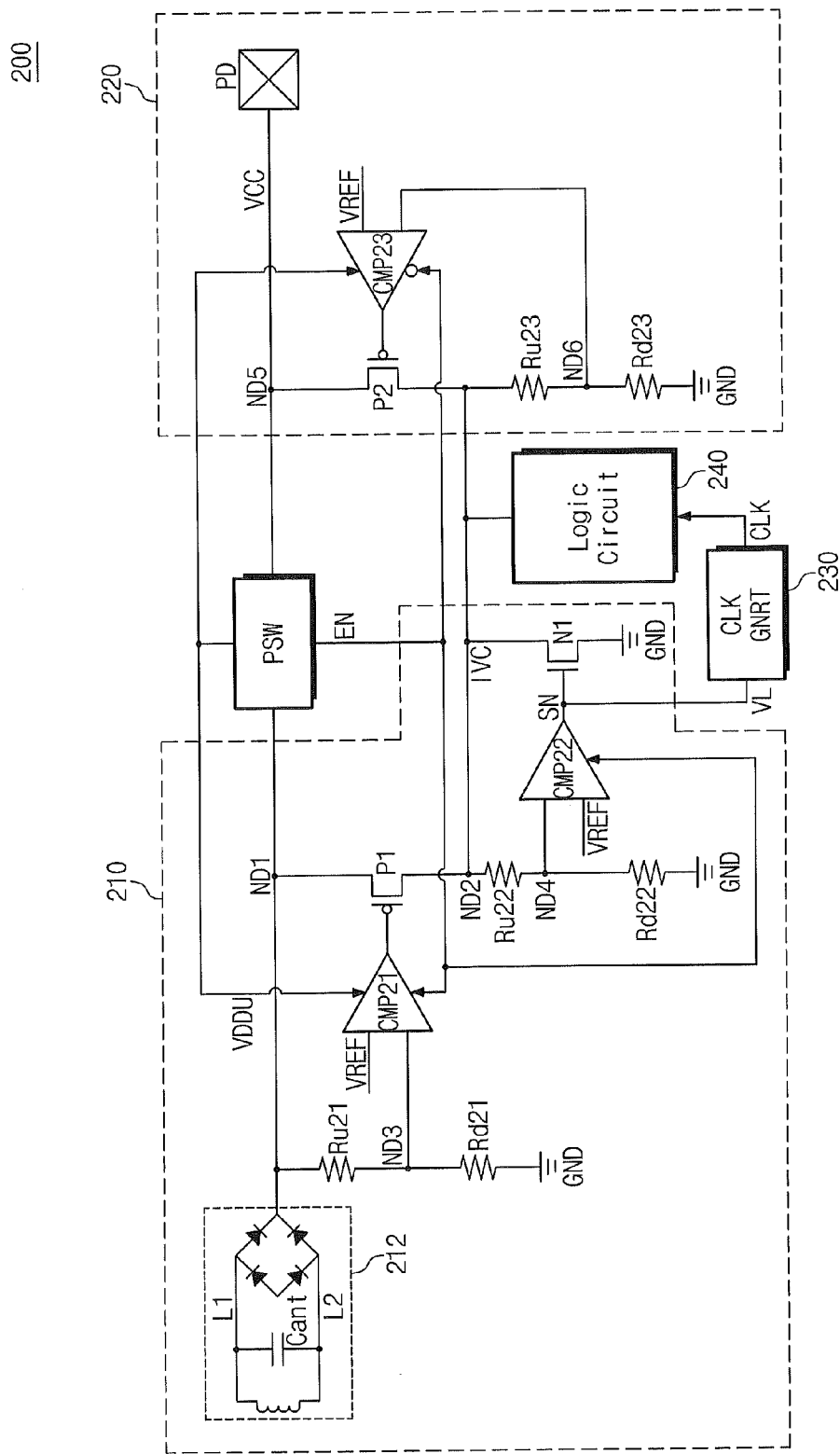
FIG. 5 is a diagram schematically illustrating an RFID device according to some embodiments of the inventive concept.

Referring now to FIG. 5, a diagram schematically illustrating an RFID device according to some embodiments of the inventive concept will be discussed. As illustrated in FIG. 5, an RFID device 200 may include a contactless internal voltage generator 210, a contact internal voltage generator 220, a power switch PSW, a clock generator 230, and a logic circuit 240.

The contactless internal voltage generator 210 may receive an RF signal to generate a rectification voltage VDDU. The contactless internal voltage generator 210 may generate an internal voltage IVC using the rectification voltage VDDU and a reference voltage VREF.

The contactless internal voltage generator 210 may include an RFID rectifier 212, a first PMOS transistor P1, a first NMOS transistor N1, a first comparator CMP21, a second comparator CMP22, a first upper resistor Ru21, a first lower resistor Rd21, a second upper resistor Ru22, and a second lower resistor Rd22.

In some embodiments, the RFID rectifier 212 may be a bridge including four diodes, and may receive an RF signal to generate the rectification voltage VDDU.

The first PMOS transistor P1 may control the amount of current flowing into a second node ND2. The first PMOS transistor P1 may have a drain connected with a first node ND1 to receive the rectification voltage VDDU and a source connected with the second node ND2 to output an internal voltage IVC.

The first NMOS transistor N1 may control the amount of current output from the second node ND2. The first NMOS transistor N1 may be connected between the second node ND2 and a ground GND, and may have a source connected to receive the internal voltage IVC and a drain grounded.

The first comparator CMP21 may compare the reference voltage VREF and a voltage (or, a first division voltage) of a third node ND3 to output a comparison result to a gate of the first PMOS transistor P1. In other words, the first comparator CMP21 may maintain the internal voltage IVC constantly by controlling the first PMOS transistor P1 according to the first division voltage of the third node ND3 corresponding to the rectification voltage VDDU.

The second comparator CMP22 may compare the reference voltage VREF and a voltage (or, a second division voltage) of a fourth node ND4 to output a comparison result to a gate of the first NMOS transistor N1. In other words, the second comparator CMP22 may maintain the internal voltage IVC constantly by controlling the first NMOS transistor N1 according to the second division voltage of the fourth node ND4 corresponding to the internal voltage IVC.

In some embodiments, the first node ND1 may have different rectification voltages according to a communication mode and an operating mode. For example, the rectification voltage VDDU may be maintained to be higher than the internal voltage IVC at the communication mode. The rectification voltage VDDU may be the same as the internal voltage IVC at the operating mode. Thus, it may be relatively easy to recover a communication signal at the communication mode, and current inflow may be increased at the operating mode.

In some embodiments, a current flowing into the second node ND2 may be discharged to a ground GND via a current control path according to a control of the first NMOS transistor N1. At this time, the amount of current supplied from the first node ND1 may be the same as a sum of the amount of current consumed at the logic circuit 240 and the amount of current consumed at the current control path.

In some embodiments, the first and second comparators CMP21 and CMP22 may be activated in response to an enable signal EN.

The first upper resistor Ru21 and the first lower resistor Rd21 may be used to divide the rectification voltage VDDU. The first upper resistor Ru21 may be connected between the first node ND1 and the third node ND3, and the first lower resistor Rd21 may be connected between the third node ND3 and a ground GND.

The second upper resistor Ru22 and the second lower resistor Rd22 may be used to divide the internal voltage IVC. The second upper resistor Ru22 may be connected between the second node ND2 and the fourth node ND4, and the second lower resistor Rd22 may be connected between the fourth node ND4 and a ground GND.

The contactless internal voltage generator 210 may generate the internal voltage IVC in response to the enable signal EN.

The contact internal voltage generator 220 may receive a power supply voltage VCC from an external device via a pad PD, and may generate the internal voltage IVC using the power supply voltage VCC and the reference voltage VREF.

The contact internal voltage generator 220 may include a second PMOS transistor P2, a third comparator CMP23, a third upper resistor Ru23, and a third lower resistor Rd23.

The second PMOS transistor P2 may have a source connected with a fifth node ND5, connected with the pad PD, to receive the power supply voltage VCC and a drain connected to the second node ND2 to output the internal voltage IVC.

The third comparator CMP23 may compare the reference voltage VREF and a voltage (or, a third division voltage) of a sixth node ND6 to output a comparison result to a gate of the second PMOS transistor P2. In other words, the third comparator CMP23 may maintain the internal voltage IVC constantly by controlling the second PMOS transistor P2 according to the third division voltage of the sixth node ND6 corresponding to the internal voltage IVC.

In some embodiments, the third comparator CMP23 may be activated in response to an inverted version of the enable signal EN.

The third upper resistor Ru23 and the third lower resistor Rd23 may be used to divide the internal voltage IVC. The third upper resistor Ru23 may be connected between the second node ND2 and the sixth node ND6, and the third lower resistor Rd23 may be connected between the sixth node ND6 and a ground GND.

The contact internal voltage generator 220 may generate the internal voltage IVC in response to an inverted version of the enable signal EN.

The power switch PSW may receive the rectification voltage VDDU from the first node ND1 or an external voltage VCC from the fifth node ND5 connected with the pad PD to generate the enable signal EN. For example, at a contactless mode, the power switch PSW may receive the rectification voltage VDDU from the first node ND1 to generate the enable signal EN for enabling the first and second comparators CMP21 and CMP22. At a contact mode, the power switch PSW may receive the power supply voltage VCC from the fifth node ND5 to generate the enable signal EN for enabling the third comparator CMP23.

The power switch PSW may apply the rectification voltage VDDU or the power supply voltage VCC to the first to third comparators CMP21 to CMP23.

In some embodiments, the reference voltage VREF may be generated from a reference voltage generator, which generates the reference voltage VREF using the rectification voltage VDDU or the power supply voltage VCC.

The clock generator 230 may be connected with a sensing node SN to sense the amount of sink current flowing via a sink path. The clock generator 230 may generate a clock CLK according to the amount of current sensed. The clock generator 230 may be configured similar to the clock generator 130 discussed with respect to FIG. 3 above. The logic circuit 240 may be driven by the internal voltage IVC and the clock CLK. An RFID device 200 according to the inventive concept may vary a frequency of the clock CLK according to a current consumed at a contact mode or a contactless mode.

Figure 6:
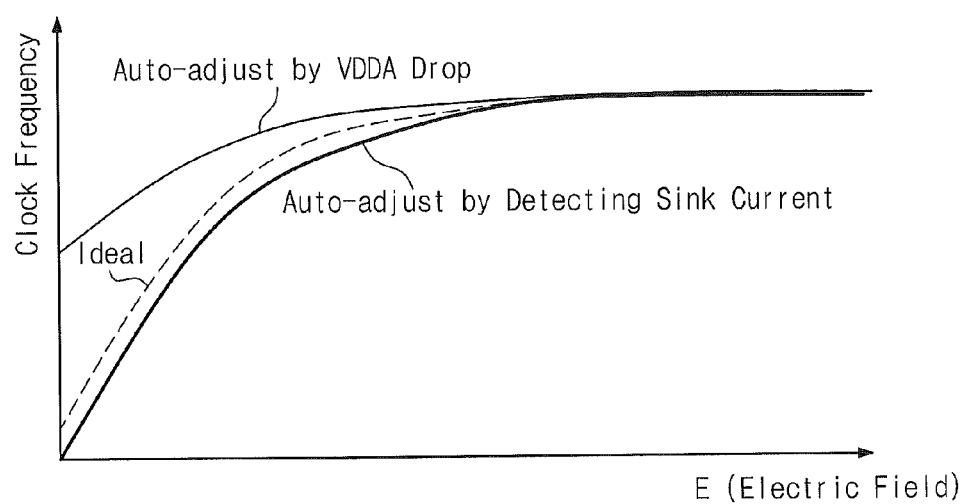
FIG. 6 is a diagram illustrating a variation in a frequency of a clock signal according to some embodiments of the inventive concept.

Referring now to FIG. 6, a diagram illustrating a variation in a frequency of a clock signal according to some embodiments of the inventive concept will be discussed. As illustrated in FIG. 6, in a conventional RFID device, when an electric field E is weak, a frequency of a clock CLK may be higher or lower than an ideal frequency due to a drop of an internal voltage VDDA. With RFID devices 100/200 in accordance with embodiments of the present inventive concept, although an electric field E is weak, a frequency of the clock CLK may be similar to the ideal frequency. As used herein, a weak electric field implies that a magnitude of an RF signal is small. Thus, the amount of current consumed may be more than the amount of current supplied.

Thus, RFID devices 100/200 in accordance with embodiments of the present inventive concept may generate a frequency of the clock CLK based on the amount of sink current sensed, so that it has substantially ideal frequency characteristics and is relatively safe from an external power analysis attack.

In embodiments of the present inventive concept discussed above with respect to FIGS. 1 through 6, RFID devices include a clock generator 130/230 to generate a clock according to the amount of current sensed. However, it will be understood that embodiments of the present inventive concept are not limited thereto.

Figure 7:
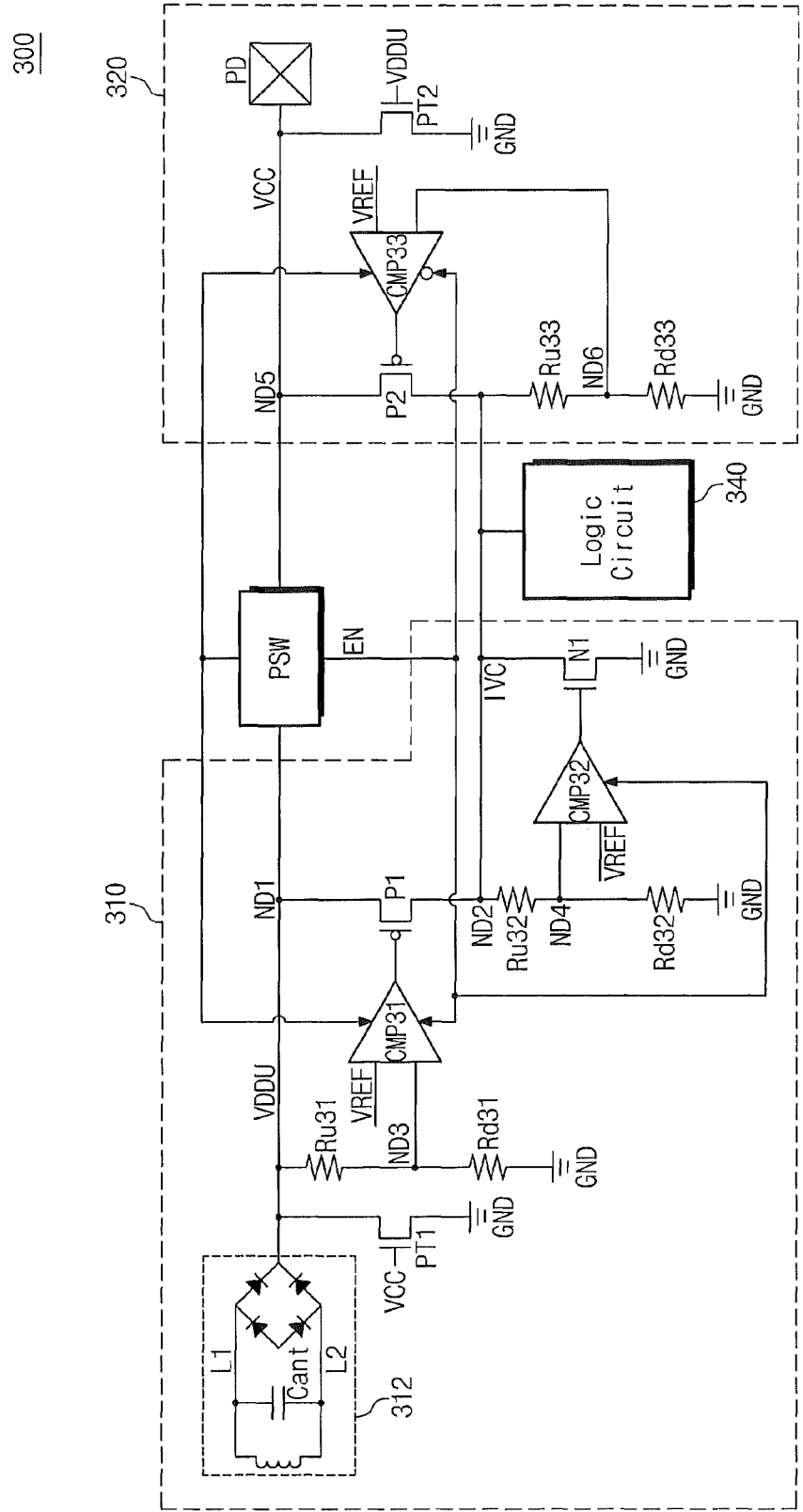
FIG. 7 is a diagram schematically illustrating an RFID device according to some embodiments of the inventive concept.

Referring now to FIG. 7, a diagram schematically illustrating an RFID device according to some embodiments of the inventive concept will be discussed. As illustrated in FIG. 7, an RFID device 300 may include a contactless internal voltage generator 310, a contact internal voltage generator 320, a power switch PSW, and a logic circuit 340. The RFID device 300 may have such a structure that the clock generator 230 discussed above is removed from an RFID device 200 in FIG. 5.

The contactless internal voltage generator 310 may further include a first protection transistor PT1 in comparison with a contactless internal voltage generator 210 in FIG. 5. The first protection transistor PT1 may reduce the likelihood that a rectification voltage VDDU will be floated. The first protection transistor PT1 may connect a first node ND1 with a ground GND in response to a power supply voltage VCC. In other words, a voltage of the first node ND1 may be discharged via the first protection transistor PT1.

The contact internal voltage generator 320 may further include a second protection transistor PT2 in comparison with a contact internal voltage generator 220 in FIG. 5. The second protection transistor PT2 may reduce the likelihood that a power supply voltage VCC will be floated. The second protection transistor PT2 may connect a fifth node ND5 with a ground GND in response to a rectification voltage VDDU. In other words, a voltage of the fifth node ND5 may be discharged via the second protection transistor PT2.

In some embodiments, each of the first and second protection transistors PT1 and PT2 may be an NMOS transistor. There is no need for an RFID device of the inventive concept to include the first and second protection transistors PT1 and PT2.

Conventional RFID devices may include a power switch on a contactless internal voltage generator and a power switch on a contact internal voltage generator, independently. Furthermore, conventional RFID devices may generate an internal voltage using a three-stage structure. On the other hand, the RFID 300 in accordance with some embodiments of the inventive concept may be configured such that the contactless internal voltage generator 310 and the contact internal voltage generator 320 share a power switch PSW, and may include the contactless internal voltage generator 310 to generate the internal voltage IVC in a two-stage structure. Thus, in comparison with the conventional RFID device, a chip area of the RFID 300 of the inventive concept may be considerably reduced.

The RFID 300 of the inventive concept may further include an auto gain controller (AGC) to control a gain of an input signal.

Figure 8:
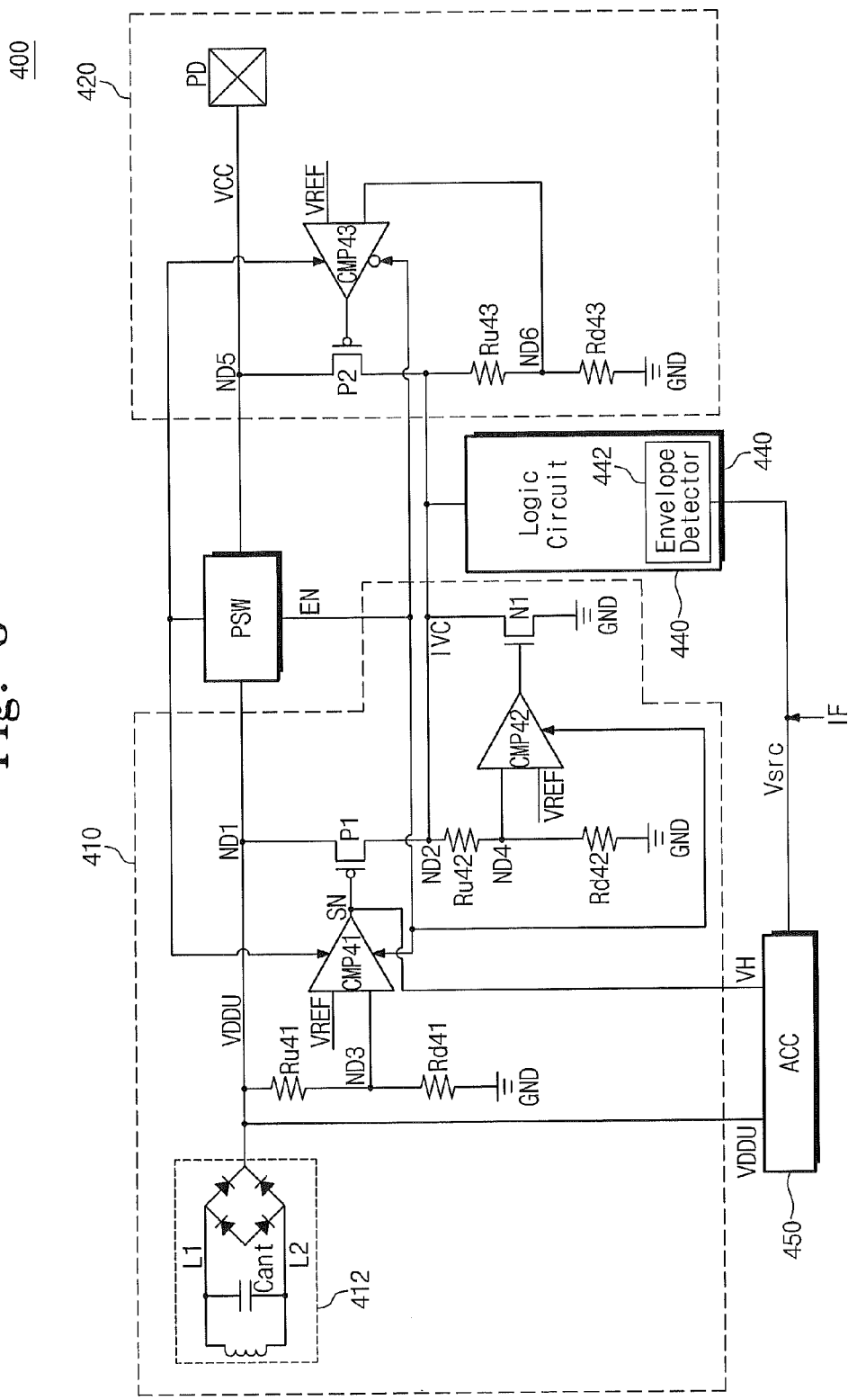
FIG. 8 is a diagram schematically illustrating an RFID device according to some embodiments of the inventive concept.

Referring now to FIG. 8, a diagram schematically illustrating an RFID device according to some embodiments of the inventive concept. As illustrated in FIG. 8, the RFID device 400 may include a contactless internal voltage generator 410, a contact internal voltage generator 420, a power switch PSW, and a logic circuit 440. The RFID device 300 may have such a structure that a clock generator 230 of FIG. 5 is removed from an RFID device 200 in FIG. 5 and an auto gain controller 450 is added.

The logic circuit 440 may include an envelope detector 442 which restores data of an RF signal IF by detecting a voltage of the RF signal IF input to a detection node Vsrc. For example, the envelope detector 442 may restore data of the RF signal by detecting such a voltage difference that a ratio of a maximum value to a minimum value is more than about 10%.

The auto gain controller 450 may mirror a path of a rectification voltage VDDU and a path of an internal voltage IVC and adjust the amount of current of the detection node Vsrc for detecting the RF signal IF. For example, the auto gain controller 450 may adjust the amount of current of the detection node Vsrc for detecting the RF signal IF using the rectification voltage VDDU of a first node ND1 and a voltage VH of a sensing node SN. In some embodiments, the auto gain controller 450 may adjust a supply current of the detection node Vsrc or a sink current of the detection node Vsrc. In some embodiments, the auto gain controller 450 may be activated at a receiving mode of the RFID device 400.

A general RFID device must secure an operation on a wide power region of from about 1.5 A/m to about 7.5 A/m according to a distance from a device transmitting an RF signal. Since an operation at the wide power region is recognized as relative reduction of a data signal, restoration of an input signal may be difficult.

On the other hand, the RFID device 400 of the inventive concept may restore an RF signal more stably through the auto gain controller 450 which adjusts the amount of current of the detection node Vsrc using the rectification voltage VDDU and the voltage VH.

Figure 9:
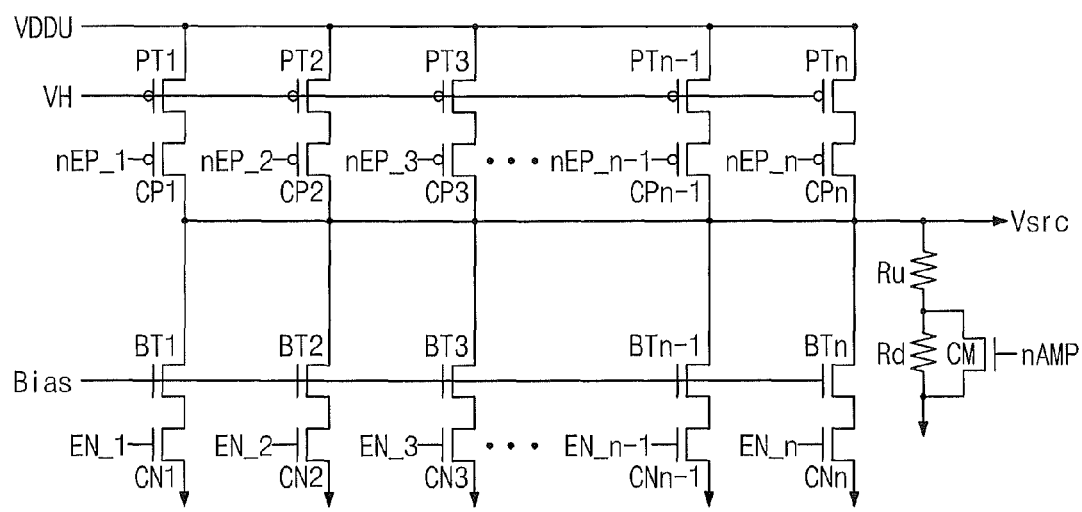
FIG. 9 is a diagram schematically illustrating an auto gain controller according to some embodiments of the inventive concept.

Referring now to FIG. 9, a diagram schematically illustrating an auto gain controller according to some embodiments of the inventive concept will be discussed. As illustrated in FIG. 9, an auto gain controller 450 may include a plurality of power transistors PT1 to PTn (n being an integer of 2 or more) for applying a rectification voltage VDDU in response to a voltage VH of a gain control node NDg; a plurality of PMOS transistor CP1 to CPn connected in series with the power transistors PT1 to PTn and providing a detection node Vsrc with corresponding currents in response to PMOS enable signals nEP1_1 to nEP_n; a plurality of bias transistors BT1 to BTn connected with the detection node Vsrc and turned on in response to a bias voltage Bias; a plurality of control NMOS transistors CN1 to CNn connected with the bias transistors BT1 to BTn and discharging corresponding currents from the detection node Vsrc to a ground GND in response to an NMOS enable signal EN1 to EN_n; an upper resistor Ru, a lower resistor Rd; and a control transistor CM.

The auto gain controller 450 in FIG. 9 may be formed of a portion to supply a current to the detection node Vsrc by sequentially turning on the control PMOS transistors CP1 to CPn and a portion to drain a current from the detection node Vsrc by sequentially turning on the control NMOS transistors CN1 to CNn.

The control transistor CM may vary a resistance value connected with the detection node Vsrc in response to an amplification signal nAMP. For example, when the amplification signal nAMP is at a high level, the upper resistor Ru may be connected with the detection node Vsrc. When the amplification signal nAMP is at a low level, the upper and lower resistors Ru and Rd may be connected with the detection node Vsrc.

Figure 10:
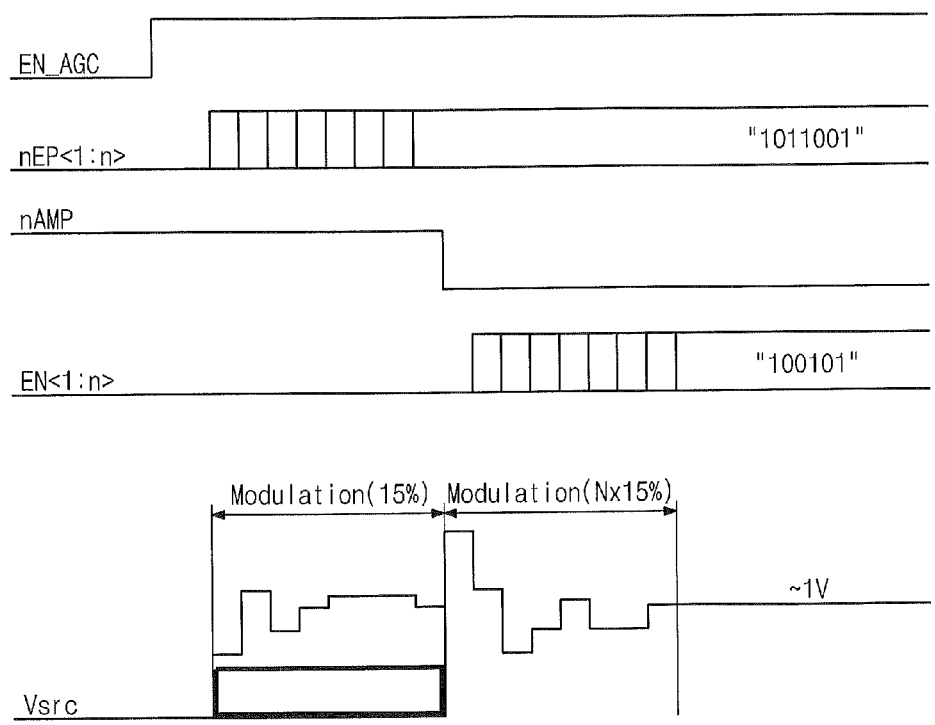
FIG. 10 is a diagram illustrating voltage level modulation of a detection node of an auto gain controller in FIG. 9.

Referring now to FIG. 10, a timing diagram illustrating voltage level modulation of a detection node of an auto gain controller in FIG. 9 will be discussed. As illustrated in FIG. 10, a voltage level modulating operation of a detection node Vsrc may be as follows. At an initial operation, an auto gain controller 450 may maintain a voltage level of a detection node Vsrc at about 1.0V by adjusting the amount of current input from a rectification voltage VDDU using PMOS enable signals nEP1 to nEPn. For ease of description, there is illustrated an example where input PMOS enable signals nEP1 to nEPn are "1011001"

The auto gain controller 450 may increase a voltage level by a supply current by increasing a resistance value connected with a detection node Vsrc through a change of a level of an amplification signal nAMP. As illustrated in FIG. 10, the amplification signal nAMP may be changed after the PMOS enable signals nEP1 to nEPn are changed. This may be to increase an input gain of an RF signal. The auto gain controller 450 may make the detection node Vsrc reach a target voltage of 1.0V using the NMOS enable signals EP1 to EPn.

For ease of description, there is illustrated an example where input NMOS enable signals EP1 to EPn are "100101". A voltage of the detection node Vsrc may be maintained at 1.0V, and the amount at generation of current modulation by an RFID signal may be directly applied to the detection node Vsrc.

In some embodiments, currents flowing via the control PMOS transistors CP1 to CPn may be similar or different. Similarly, in some embodiments, currents flowing via the control NMOS transistors CN1 to CNn may be similar or different.

Figure 11:
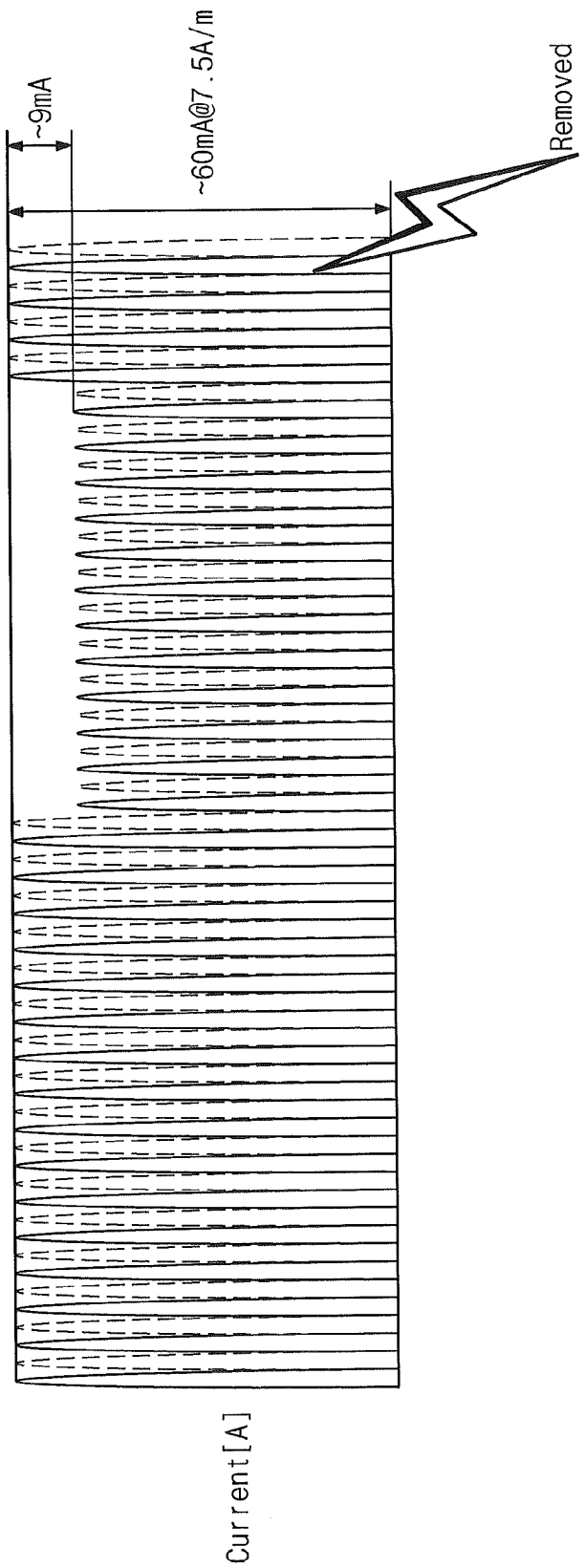
FIG. 11 is a diagram illustrating an effect according to modulation of a voltage level of a detection node of FIG. 9.

Referring now to FIG. 11, a diagram illustrating an effect according to modulation of a voltage level of a detection node of FIG. 9 will be discussed. As illustrated in FIG. 11, in embodiments where an input current is large, a large amount of common current may be removed by modulating a voltage level of a detection node Vsrc. Thus, a ratio of a maximum current to a minimum current may increase. This may mean that it is relatively easy to restore data of an input signal IF.

A maximum value of an input current of an original RF signal may be about 60 mA, and a difference between the maximum value and a minimum value may be about 9 mA. In some embodiments of the inventive concept, half the maximum value of an input current of an original RF signal may be removed through the auto gain controller 450 (FIG. 9). Thus, a ratio of a maximum value to a minimum value after modulation may remarkably increase in comparison with an original ratio of a maximum value to a minimum value. In other words, it may be substantially easier to detect data of an input RF signal.

Figure 12:
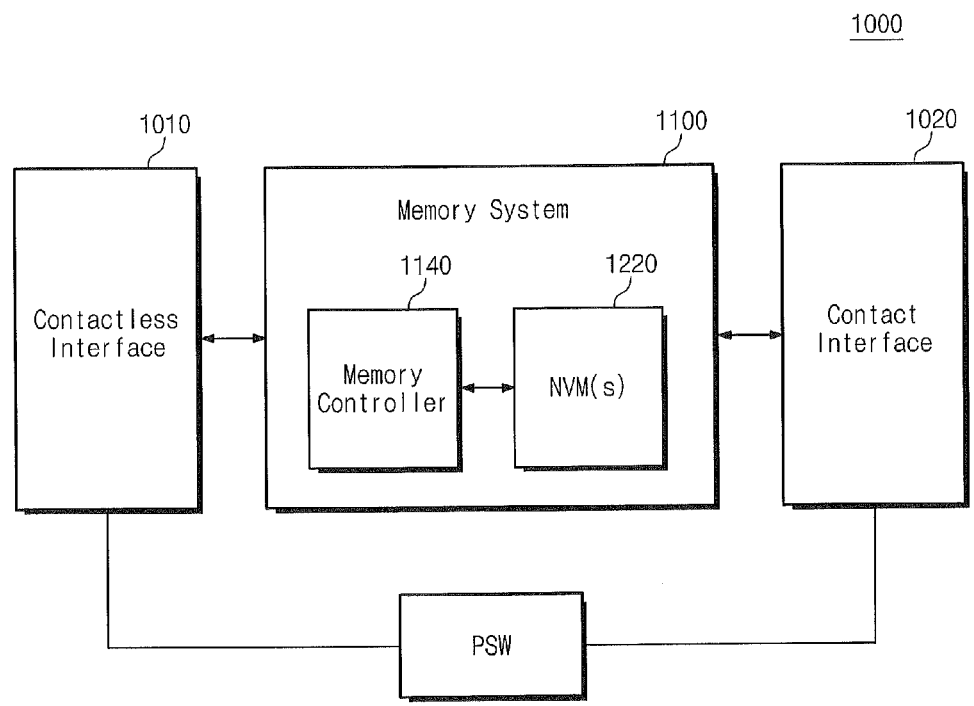
FIG. 12 is a block diagram schematically illustrating a smart card according to some embodiments of the inventive concept.

Referring now to FIG. 12, a block diagram schematically illustrating a smart card according to some embodiments of the inventive concept will be discussed. Referring to FIG. 12, a smart card 1000 may include a contactless interface 1010, a contact interface 1020, a power switch PSW, and a memory system 1100.

The contactless interface 1010 may include first and second voltage regulators 110 and 120 and a clock generator 130 of an RFID device 100 in FIG. 1, a contactless internal voltage generator 210 and a clock generator 230 of an RFID device 200 in FIG. 5, a contactless internal voltage generator 310 of an RFID device 300 in FIG. 7, or a contactless internal voltage generator 410 and an auto gain controller 450 of an RFID device 400 in FIG. 8.

The contact interface 1020 may include a contact internal voltage generator 220 of an RFID device 200 in FIG. 5, a contact internal voltage generator 320 of an RFID device 300 in FIG. 7, or a contact internal voltage generator 420 of an RFID device 400 in FIG. 8 or some combination thereof.

The memory system 1100 may include at least one nonvolatile memory device 1220 and a memory controller 1140 controlling the at least one nonvolatile memory device 1220. The nonvolatile memory device 1220 may be supplied with an external high voltage Vpp optionally. The memory controller 1140 may be connected with the nonvolatile memory device 1220. The memory system 1100 may be, for example, one of Multimedia Card (MMC), Security Digital (SD), miniSD, Memory Stick using USB, Smart Media, TransFlash card, and the like.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A radio frequency identification (RFID) device comprising:
   a contactless internal voltage generator configured to generate a rectification voltage responsive to a radio frequency (RF) input signal and an internal voltage responsive to the generated rectification voltage and a reference voltage;
   a clock generator configured to sense an amount of current to a sink path of the contactless internal voltage generator and to generate a clock signal using a variable resistance value, the variable resistance value based on the amount of current sensed; and
   an internal circuit driven by the internal voltage and the clock signal,
   wherein the sink path is a current path of a current sinker in the contactless internal voltage generator.

2. The RFID device of claim 1, wherein the contactless internal voltage generator is further configured to generate an induced voltage responsive to the RF input signal and to rectify the induced voltage to generate the rectification voltage.

3. The RFID device of claim 2, wherein the contactless internal voltage generator comprises:
   a first transistor between a first node that outputs the rectification voltage and a second node that outputs a first internal voltage;
   a second transistor between the second node and a ground;
   a third transistor between the second node and a third node that outputs the internal voltage;
   a first comparator configured to output a first comparison value between the reference voltage and a first division voltage to a gate of the first transistor;
   a second comparator configured to output a second comparison value between the reference voltage and a second division voltage to a gate of the second transistor; and
   a third comparator configured to output a third comparison value between the reference voltage and a third division voltage to a gate of the third transistor,
   wherein the first division voltage is a division voltage of the rectification voltage via first resistors connected in series between the first node and a ground, the second division voltage is a division voltage of the first internal voltage via second resistors connected in series between the second node and the ground, and the third division voltage is a division voltage of the internal voltage via third resistors connected in series between the third node and the ground.

4. The RFID device of claim 3, wherein the contactless internal voltage generator further comprises:
   a first rectification capacitor between the first node and the ground and configured to maintain a level of the first internal voltage constantly; and
   a second rectification capacitor between the second node and the ground and configured to maintain a level of the first internal voltage constantly.

5. The RFID device of claim 2, wherein the contactless internal voltage generator comprises:
   a first PMOS transistor between a first node that outputs the rectification voltage of the RFID rectifier and a second node that outputs the internal voltage;
   a first NMOS transistor between the second node and a ground;
   a first comparator configured to output a first comparison result between the reference voltage and a first division voltage to a gate of the first PMOS transistor; and a second comparator configured to output a second comparison result between the reference voltage and a second division voltage to a gate of the first NMOS transistor, wherein the first division voltage is a division voltage of the rectification voltage via first resistors connected in series between the first node and the ground, and the second division voltage is a division voltage of the internal voltage via second resistors connected in series between the second node and the ground.

6. The RFID device of claim 1, further comprising a contact internal voltage generator configured to receive a power supply voltage from an external device from a pad and to generate the internal voltage using the power supply voltage and the reference voltage.

7. The RFID device of claim 6, wherein the contact internal voltage generator comprises:
a PMOS transistor between a power terminal supplied with the power supply voltage and an output terminal that outputs the internal voltage; and
a comparator configured to output a comparison result between the reference voltage and a division voltage to a gate of the PMOS transistor,
wherein the division voltage is a division voltage of the internal voltage via resistors connected in series between the output terminal and a ground.

8. The RFID device of claim 6, further comprising:
a power switch configured to generate an enable signal when one of the rectification voltage is supplied from the contactless internal voltage generator and the power supply voltage is supplied from the contact internal voltage generator, the contactless internal voltage generator and/or the contact internal voltage generator being activated by the enable signal.

9. The RFID device of claim 8, further comprising:
a first protection transistor configured to connect a first node that outputs the rectification voltage to a ground when the power supply voltage is applied to the power switch; and
a second protection transistor configured to connect the pad to the ground when the rectification voltage is applied to the power switch.

10. The RFID device of claim 1, wherein the clock generator comprises:
a current amount sensing unit configured to sense a voltage corresponding to the amount of current flowing to the sink path and to provide a sensing current corresponding to the sensed voltage flow; and
an RC clock generator configured to generate the clock signal using the variable resistance value corresponding to the sensing current and a capacitor.

11. The RFID device of claim 10, wherein the RC clock generator comprises:
a control voltage generating unit configured to output a control voltage corresponding to the sensing current;
a first internal signal generating unit configured to generate a first internal voltage by comparing the control voltage and a voltage corresponding to the clock signal;
a second internal signal generating unit configured to generate a second internal voltage by comparing the control voltage and a voltage corresponding to an inverted version of the clock signal; and a clock generating unit configured to generate the clock by performing an AND operation on the second internal signal and the inverted version of the clock signal and to generate the inverted version of the clock signal by performing an AND operation on the first internal signal and the clock signal.

12. The RFID device of claim 1, further comprising a reference voltage generator configured to generate the reference voltage.

13. A radio frequency identification (RFID) device comprising:
a contactless internal voltage generator configured to generate a rectification voltage responsive to an input of a radio frequency (RF) signal and an internal voltage based on the rectification voltage and a reference voltage in response to an enable signal;
a contact internal voltage generator configured to generate the internal voltage based on a power supply voltage externally provided and the reference voltage in response to the enable signal;
a power switch configured to generate the enable signal when one of the rectification voltage is generated and the power supply voltage is received; and
a logic circuit driven by the internal voltage
wherein the contactless internal voltage generator comprises:
an RF rectifier configured to generate an induced voltage responsive to an input of the RF signal and to output the rectification voltage obtained by rectifying the induced voltage to a first node;
a first PMOS transistor between the first node and a second node that outputs the internal voltage;
a first NMOS transistor between the second node and a ground;
a first comparator configured to output a first comparison value between the reference voltage and a first division voltage to a gate of the first PMOS transistor; and
a second comparator configured to output a second comparison value between the reference voltage and a second division voltage to a gate of the first NMOS transistor,
wherein the first division voltage is a division voltage of the rectification voltage via first resistors connected in series between the first node and a ground and the second division voltage is a division voltage of the internal voltage via second resistors connected in series between the second node and the ground; and
wherein the contact internal voltage generator comprises a second PMOS transistor between a pad supplied with the power supply voltage and the second node; and
a comparator configured to output a third comparison result between the reference voltage and a third division voltage to a gate of the second PMOS transistor, the third division voltage being a division voltage of the internal voltage via third resistors connected in series between the second node and a ground.

14. The RFID device of claim 13, further comprising:
an auto gain controller configured to mirror a path of the rectification voltage and a path of the internal voltage and to adjust the amount of current of a detection node for detecting the RF signal.

* * * * *